(12) United States Patent
Fearis et al.

(10) Patent No.: US 11,513,017 B2
(45) Date of Patent: Nov. 29, 2022

(54) SYSTEM AND METHOD OF ANALYZING DUCT PRESSURE WITHIN A PIPE

(71) Applicants: Mark Fearis, Somersworth, NH (US); Paul Owens, West Newbury, MA (US)

(72) Inventors: Mark Fearis, Somersworth, NH (US); Paul Owens, West Newbury, MA (US)

(73) Assignee: SPRUCE ENVIRONMENTAL TECHNOLOGIES INC., Ward Hill, MA (US)

( * ) Notice: Subject to any disclaimer, the term of this patent is extended or adjusted under 35 U.S.C. 154(b) by 0 days.

(21) Appl. No.: 17/068,813

(22) Filed: Oct. 12, 2020

(65) Prior Publication Data

US 2022/0113209 A1 Apr. 14, 2022

Related U.S. Application Data

(60) Provisional application No. 62/913,636, filed on Oct. 10, 2019.

(51) Int. Cl.
| | | |
|---|---|---|
| *G01L 9/06* | (2006.01) | |
| *G01L 19/12* | (2006.01) | |
| *G08B 7/06* | (2006.01) | |
| *G08B 21/18* | (2006.01) | |
| *G01L 19/00* | (2006.01) | |

(52) U.S. Cl.
CPC ............ *G01L 19/12* (2013.01); *G01L 9/06* (2013.01); *G01L 19/0015* (2013.01); *G08B 7/06* (2013.01); *G08B 21/182* (2013.01)

(58) Field of Classification Search
CPC ..... G01L 19/12; G01L 19/06; G01L 19/0007; G01L 9/06
See application file for complete search history.

(56) References Cited

U.S. PATENT DOCUMENTS

| | | | | |
|---|---|---|---|---|
| 5,554,976 | A * | 9/1996 | Miyauchi | ................ F23N 5/242 137/557 |
| 10,309,864 | B1 * | 6/2019 | Lee | ........................ G05D 7/0623 |
| 2003/0101998 | A1 * | 6/2003 | Zocca | ................... A61M 16/044 128/207.15 |
| 2010/0083730 | A1 * | 4/2010 | Le | ......................... G01N 33/28 210/90 |
| 2019/0353156 | A1 * | 11/2019 | Ward | ........................ F04B 23/04 |
| 2022/0083046 | A1 * | 3/2022 | Cella | .................. G05B 23/0286 |

* cited by examiner

*Primary Examiner* — Benyam Haile

(57) ABSTRACT

A system and method of analyzing duct pressure within a pipe monitors and detects vacuum pressure of gases. The system includes a pressure monitor and a target duct. The pressure monitor preferably includes an alarm light, a speaker, a sensing light, a service light, and a battery alert. The method begins by periodically capturing a plurality of pressure readings inside the target duct with the pressure monitor. Each pressure reading is timestamped with the pressure monitor. Each pressure reading is compared to each situational alert with the pressure monitor to identify at least one matching alert for at least one specific reading. The matching alert is from the plurality of situational alerts. The specific reading is from the plurality of pressure readings. The matching alert is visually and/or audibly outputted with the pressure monitor, if the matching alert is identified for the specific reading.

12 Claims, 14 Drawing Sheets

SYSTEM AND METHOD OF ANALYZING DUCT PRESSURE WITHIN A PIPE

The current application claims a priority to the U.S. provisional patent application Ser. No. 62/913,636 filed on Oct. 10, 2019. The current application is filed on Oct. 12, 2020 while Oct. 10, 2020 was on a weekend.

FIELD OF THE INVENTION

The present invention generally relates to pressure reading monitors. More specifically, the present invention is a system and method of analyzing duct pressure within a pipe.

BACKGROUND OF THE INVENTION

Radon is a naturally occurring gas that is radioactive and causes lung cancer. Radon can accumulate in buildings, especially in low areas such as basements. This is why every residential building is or should be required by law to have radon mitigation systems. However, there is no residential duct that continuously monitors radon mitigation systems to make sure each part of the radon mitigation system is operating correctly.

It is an object of the present invention to resolve this issue by providing such a monitor. The present invention is a system and method of analyzing duct pressure within a pipe. The present invention constantly ensures the safety of a system, such as a radon mitigation system, and a structure that contains the system. The present invention alerts a user of an issue with the system without the user being in the same room as the mechanical parts of the system. The system includes a pressure monitor that may be directly mounted and connected to any system and serves as a universal monitor for a variety of systems that may experience pressure changes. The pressure monitor includes a housing that mounts a sensing port, a battery compartment, and mounting brackets.

DETAIL DESCRIPTIONS OF THE INVENTION

All illustrations of the drawings are for the purpose of describing selected versions of the present invention and are not intended to limit the scope of the present invention.

Figure 1:
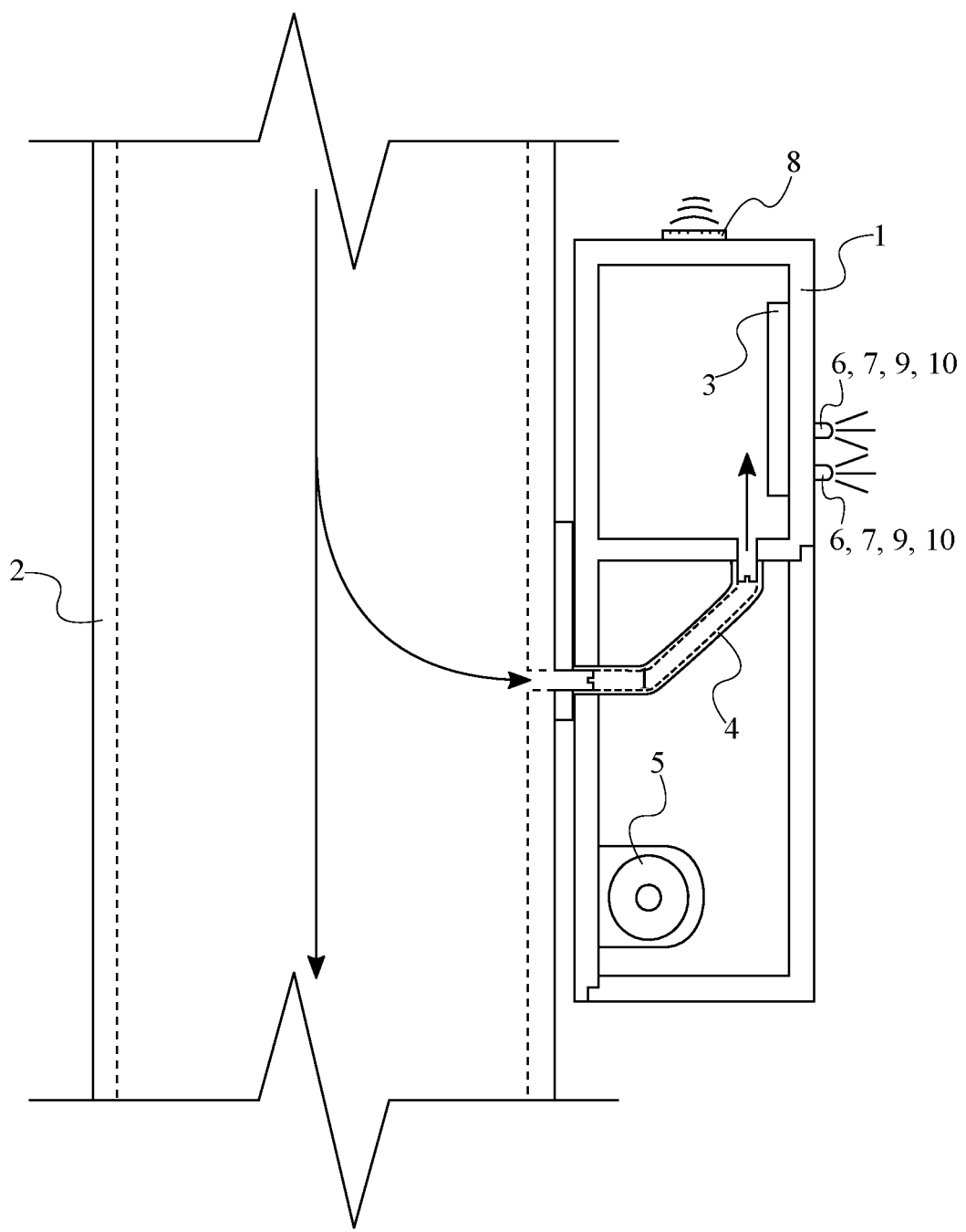
FIG. 1 is a diagram illustrating the system for the present invention.
Figure 2:
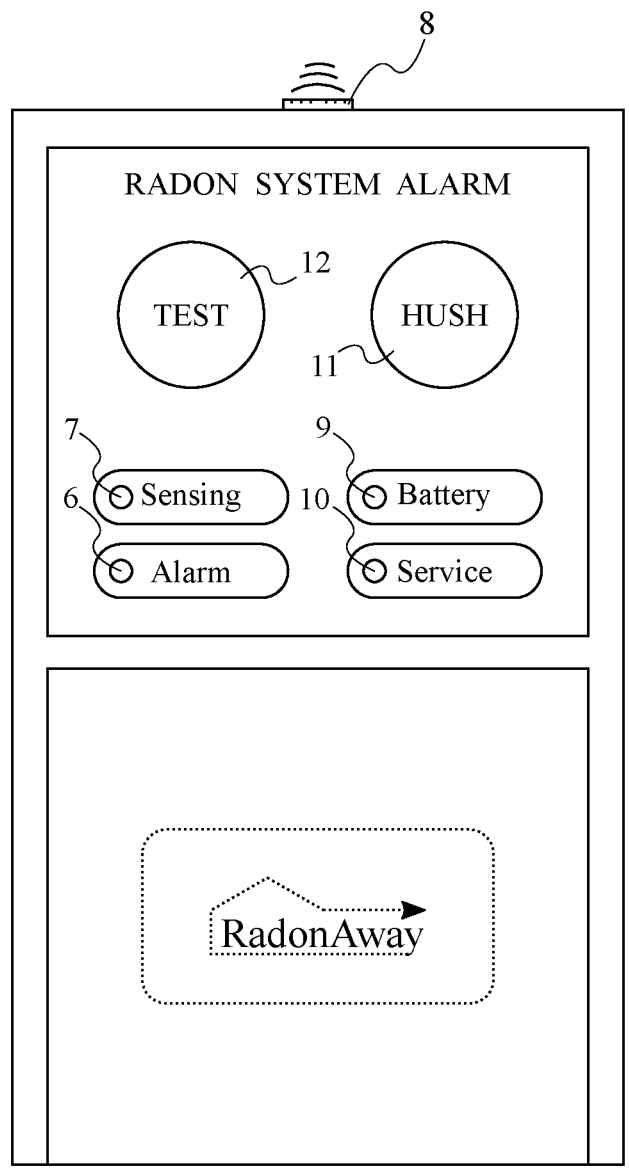
FIG. 2 is a schematic drawing illustrating a pressure monitor for the present invention.

The present invention is a system and method of analyzing duct pressure within a pipe. The present invention monitors the vacuum pressure within a pipe of a system, preferably a radon mitigation system. The present invention may be utilized with an existing radon fan and informs a user of a potential issue, such as an equipment malfunction with the radon mitigation system depending on various operating conditions. Thus, the physical system used to implement the method for the present invention includes a pressure monitor 1 and a target duct 2 (Step A), seen in FIG. 1 and FIG. 2. The pressure monitor 1 detects and monitors the duct pressure of the target duct 2. The target duct 2 is a tube that directs a gas into and/or out of a building. The pressure monitor 1 alerts a user of any pressure changes of gas within the target duct 2 and consequently the surrounding environment. In order to determine if there is an accumulation of gas with a system, the pressure monitor 1 is in fluid communication with the target duct 2, and a plurality of situational alerts is stored on the pressure monitor 1. The plurality of situational alerts identifies and distinguishes between a variety of issues with respect to the pressure monitor 1 and/or the target duct 2.

Figure 3:
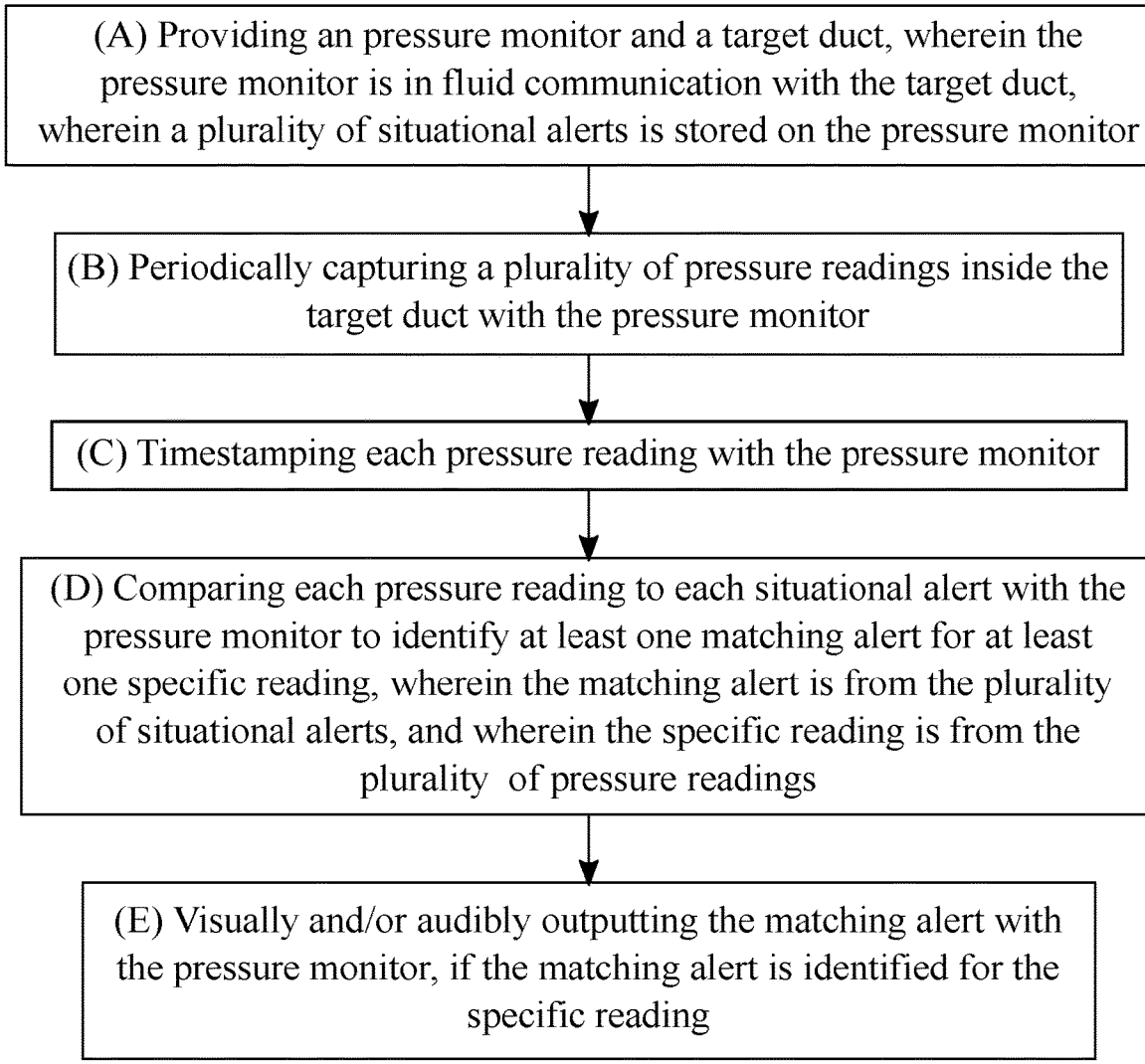
FIG. 3 is a flowchart illustrating the overall process for the method of the present invention.

The overall process for the method of the present invention includes the following steps that are implemented with the pressure monitor 1 and the target duct 2. The overall process begins by periodically capturing a plurality of pressure readings inside the target duct 2 with the pressure monitor 1 (Step B), thereby collecting data to maintain safe levels of duct pressure at all times, as seen in FIG. 3. The plurality of pressure readings provides pressure levels in real-time. In order to complete a time-dependent analysis on the plurality of pressure readings, each pressure reading is timestamped with the pressure monitor 1 (Step C). Each pressure reading is then is compared to each situational alert with the pressure monitor 1 to identify at least one matching alert for at least one specific reading (Step D). The at least one matching alert is a pressure reading that is considered to be an issue. Moreover, the specific reading is from the plurality of pressure readings. The user is made aware of the issue as the matching alert is visually and/or audibly outputted with the pressure monitor 1, if the matching alert is identified for the specific reading (Step E). More specifically, the pressure monitor 1 beeps and/or illuminates in order to alert the user of the issue.

Figure 4:
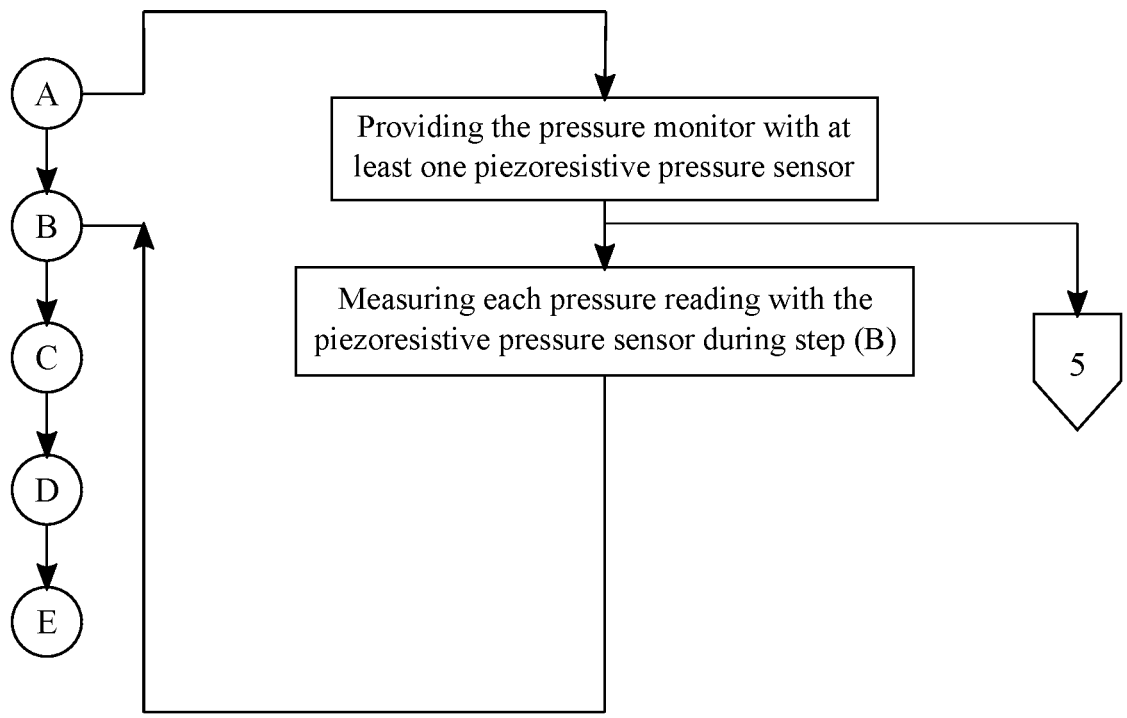
FIG. 4 is a flowchart illustrating the subprocess for measuring each pressure reading with a piezoresistive pressure sensor.
Figure 5:
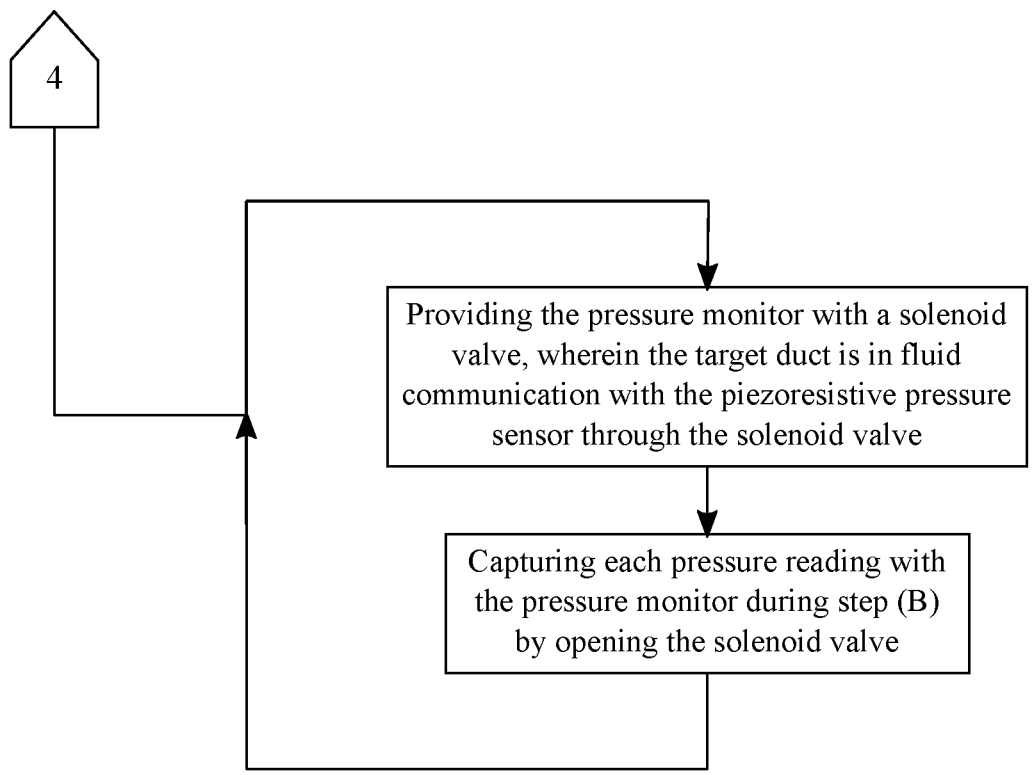
FIG. 5 is a flowchart illustrating the subprocess for capturing each pressure reaching with the pressure monitor through a solenoid valve.

The system of the present invention preferably includes a pressure monitor 1 with at least one piezoresistive pressure sensor 3, seen in FIG. 4. The at least one piezoresistive pressure sensor 3 detects and relays the plurality of pressure readings. Each pressure reading is measured with the piezoresistive pressure sensor 3 during Step B in order to determine if a pressure reading of the plurality of pressure readings reflects an issue with the target duct 2. Moreover, the target duct 2 is in fluid communication with the piezoresistive sensor through a flexible tubing 4 to safely direct the gas towards the at least one piezoresistive pressure sensor 3 that is safely housed within a compartment of the pressure monitor 1. Furthermore, the pressure monitor 1 is also provided with a solenoid valve, seen in FIG. 5. This allows the target duct 2 to be in fluid communication with the piezoresistive pressure sensor 3 through the solenoid valve in order to safely sample enough gas for the plurality of pressure readings. The solenoid valve opens and closes the airflow through the flexible tubing 4 as each pressure reading is captured with the pressure monitor 1 during Step B by opening the solenoid valve.

Figure 6:
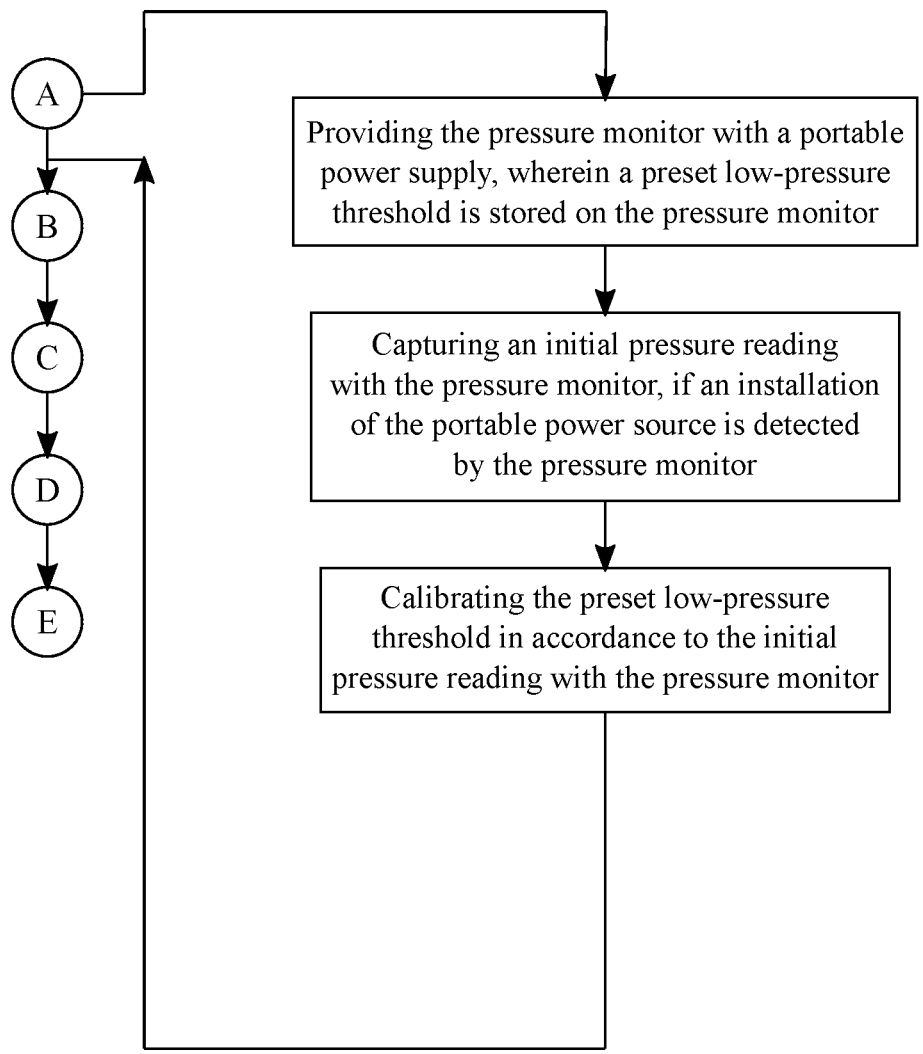
FIG. 6 is a flowchart illustrating the subprocess for calibrating a preset low-pressure threshold in accordance to an initial pressure reading.

The present invention is able to monitor different kinds of systems along with their surrounding environments and makes it necessary for the pressure monitor 1 to self-calibrate and provide accurate pressure readings. As seen in FIG. 6, the pressure monitor 1 includes a portable power supply 5, wherein a preset low-pressure threshold is stored on the pressure monitor 1. The portable power supply 5 provides the necessary power for the pressure monitor 1 to operate and accurately detect the duct pressure. The portable power supply 5 is preferably a replaceable battery. It is understood that various embodiments of the present invention may include other kinds of portable power supplies. The preset low-pressure threshold defines a minimum allowable pressure within a duct and is used to determine if a corresponding fan has stopped running or has simply just slowed down. An initial pressure reading is captured with the pressure monitor 1, if an installation of the portable power source is detected by the pressure monitor 1, thereby establishing a baseline pressure reading. The pressure monitor 1 self-calibrates according to the surrounding environment as the preset low-pressure threshold is calibrated in accordance to the initial pressure reading with the pressure monitor 1.

Figure 7:
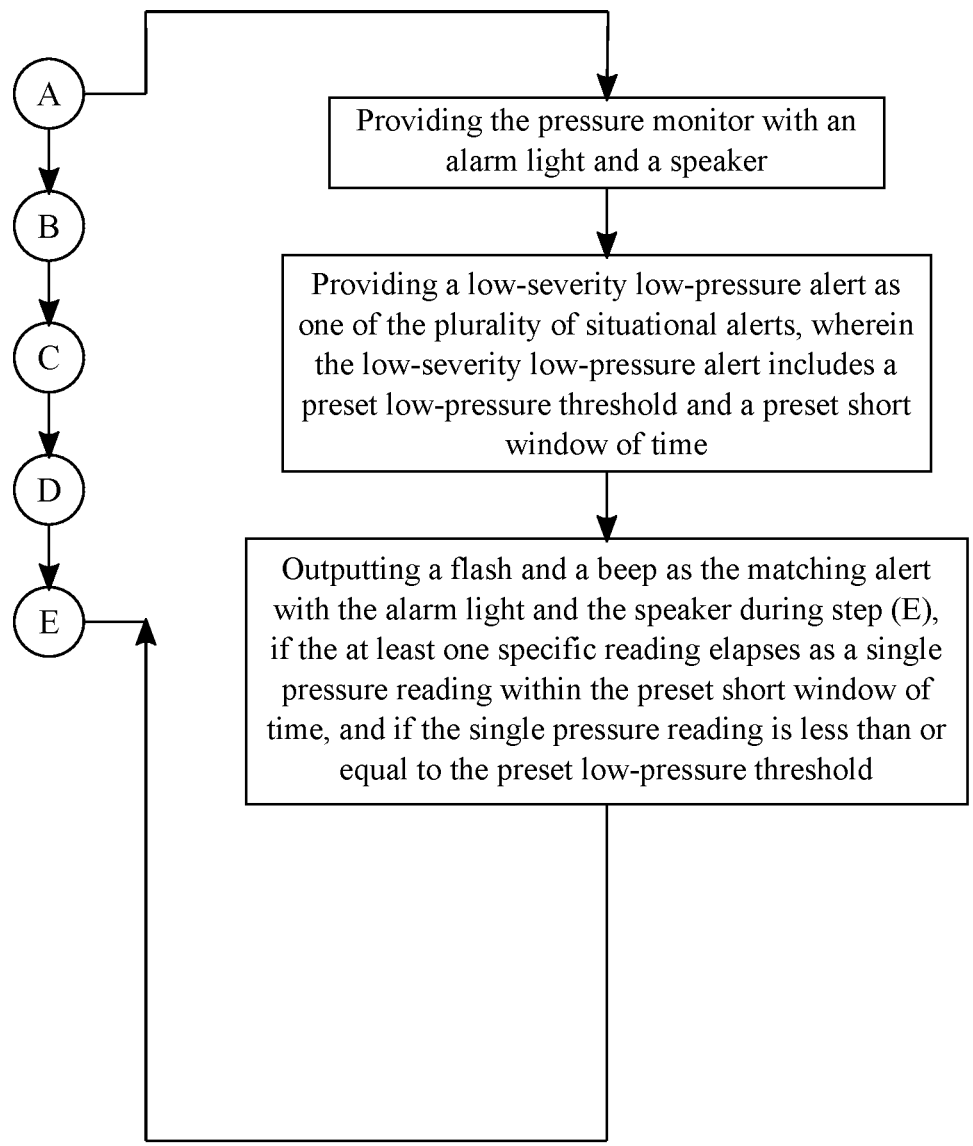
FIG. 7 is a flowchart illustrating the subprocess for outputting a flash and a beep as a matching alert with an alarm light and a speaker to indicate a low-severity low-pressure alert.

In order for the pressure monitor 1 to be able to emit a sound or light, the pressure monitor 1 is preferably provided with an alarm light 6 and a speaker 8, seen in FIG. 7. The alarm light 6 is used to visually capture a user's attention while the speaker 8 is used to audibly capture a user's attention. In order to represent an initial detection of a possible issue, a low-severity low-pressure alert is provided as one of the plurality of situational alerts. The low-severity low-pressure alert also includes a preset low-pressure threshold and a preset short window of time. The initial detection of a possible issue is the result of a minor abnormality in the plurality of pressure readings. The preset short window of time is an allowance for any abnormality to self-correct so that a user is not bothered with every minor abnormality detection by the pressure monitor 1. A flash and a beep is outputted as the matching alert with the alarm light 6 and the speaker 8 during Step E, if the at least one specific reading elapses as a single pressure reading within the preset short window of time, and if the single pressure reading is less than or equal to the preset low-pressure threshold. The single pressure reading at or below the preset low-pressure threshold within the preset short window of time indicates the low severity of the matching alert. Thus, the flash and the beep serves to notify the user of the initial detection of a possible issue.

Figure 8:
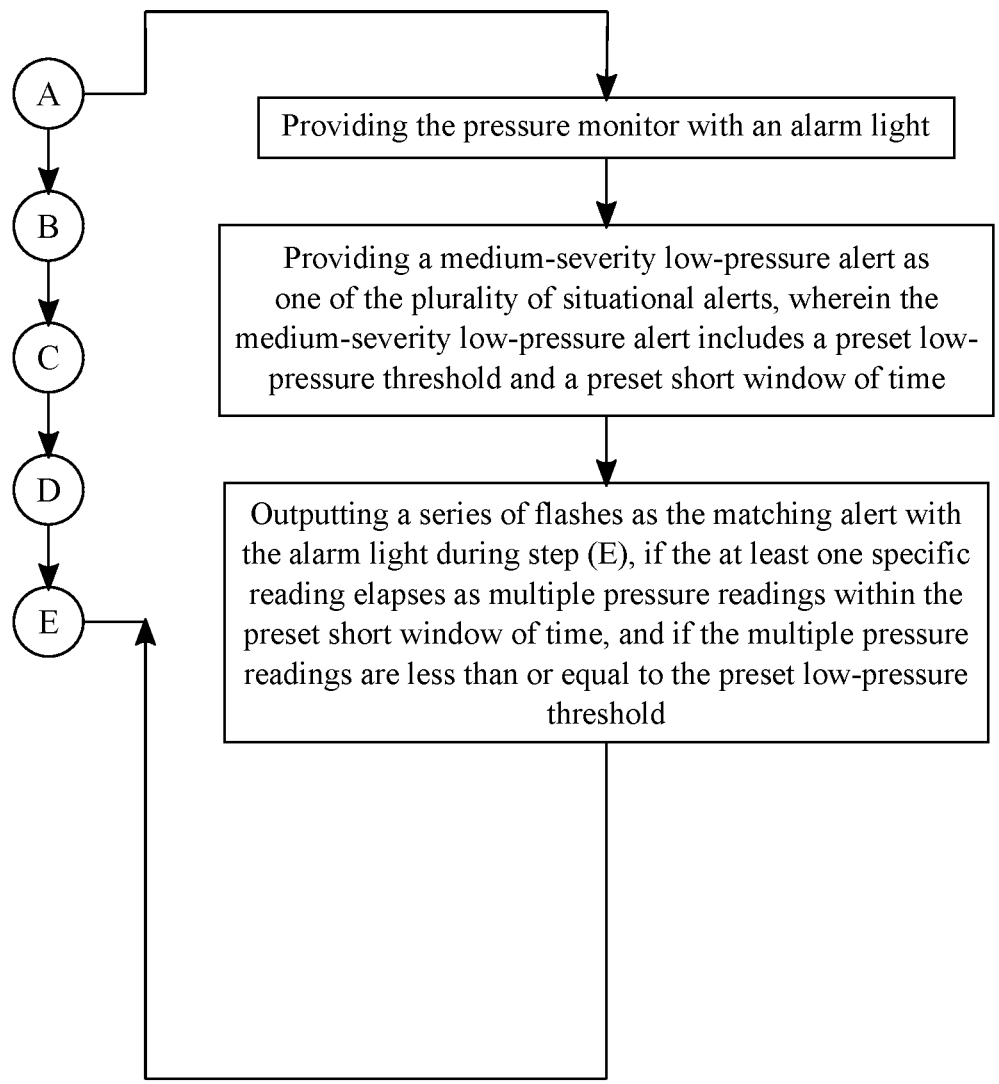
FIG. 8 is a flowchart illustrating the subprocess for outputting a series of flashes as a matching alert with the alarm light to indicate a medium-severity low-pressure alert.

In order to account for power outages and other small anomalies of a system such as a radon mitigation system, a medium-severity low-pressure alert is provided as one of the plurality of situational alerts, seen in FIG. 8. Similar to the low-severity low-pressure alert, the medium-severity low-pressure alert also includes a preset low-pressure threshold and a preset short window of time. A series of flashes is outputted as the matching alert with the alarm light 6 during Step E, if the at least one specific reading elapses as multiple pressure readings within the preset short window of time, and if the multiple pressure readings are less than or equal to the preset low-pressure threshold. The multiple pressure readings at or below the preset low-pressure threshold within the preset short window of time indicates the medium severity of the matching alert. Thus, the series of flashes serves to visually notify the user that the pressure monitor 1 is tracking the progress of a possible issue.

Figure 9:
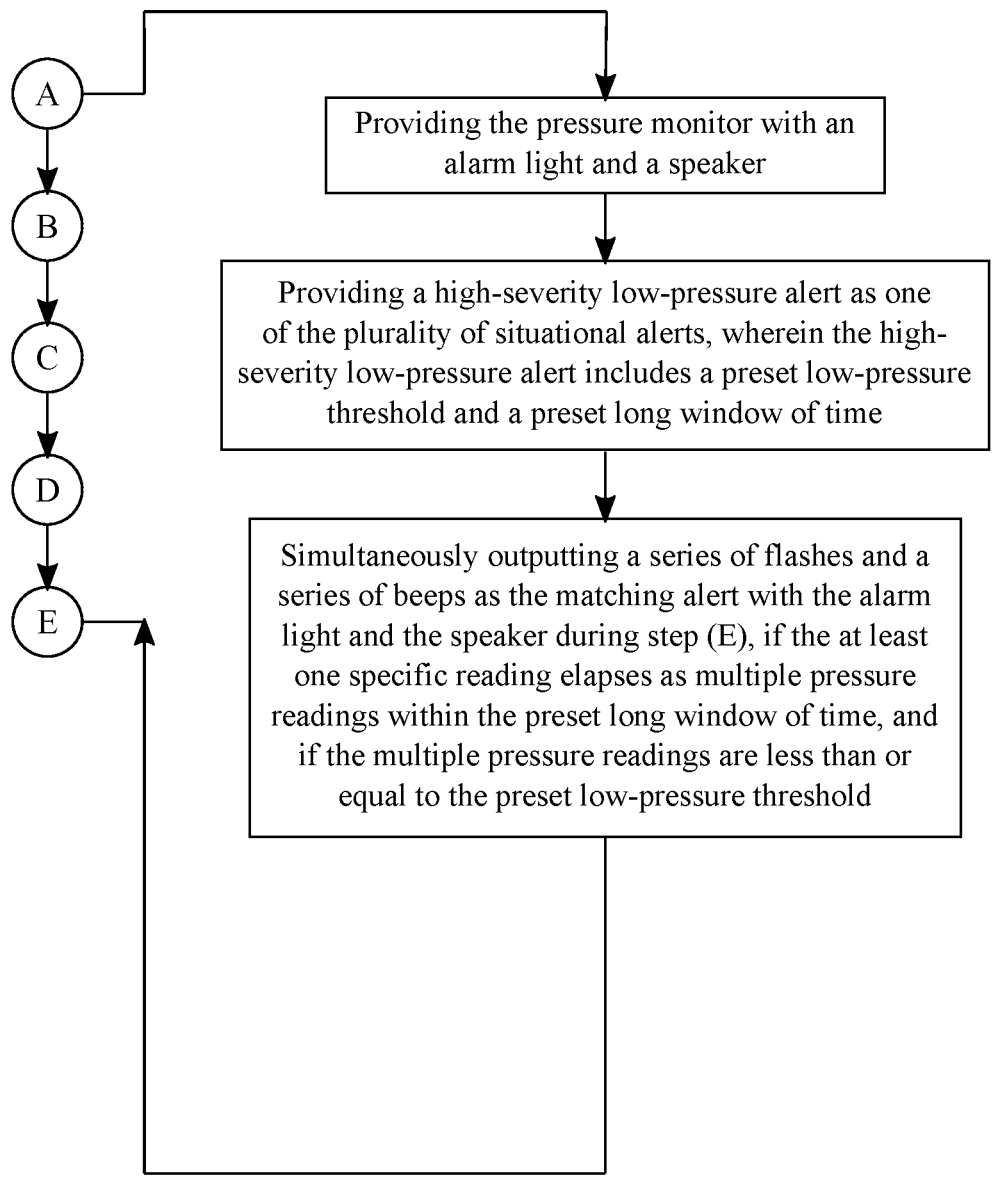
FIG. 9 is a flowchart illustrating the subprocess for simultaneously outputting a series of flashes and a series of beeps as a matching alert with the alarm light and the speaker to indicate a high-severity low-pressure alert.

An actual issue with the system, such as a radon mitigation system, is distinguished from the previous alarms as a high-severity low-pressure alert is provided as one of the plurality of situational alerts, seen in FIG. 9. The high-severity low-pressure alert includes a preset low-pressure threshold and a preset long window of time. The preset long window of time provides the necessary time range for multiple readings to be identified as a matching alert. A series of flashes and a series of beeps are simultaneously outputted as the matching alert with the alarm light 6 and the speaker 8 during Step E, if the at least one specific reading elapses as multiple pressure readings within the preset long window of time, and if the multiple pressure readings are less than or equal to the preset low-pressure threshold. The multiple pressure readings at or below the preset low-pressure threshold within the preset long window of time indicates the high severity of the matching alert. Thus, the simultaneous flashing and beeping of the pressure monitor 1 visually and audibly notifies the user of an immediate and pressing issue that needs to be addressed.

Figure 10:
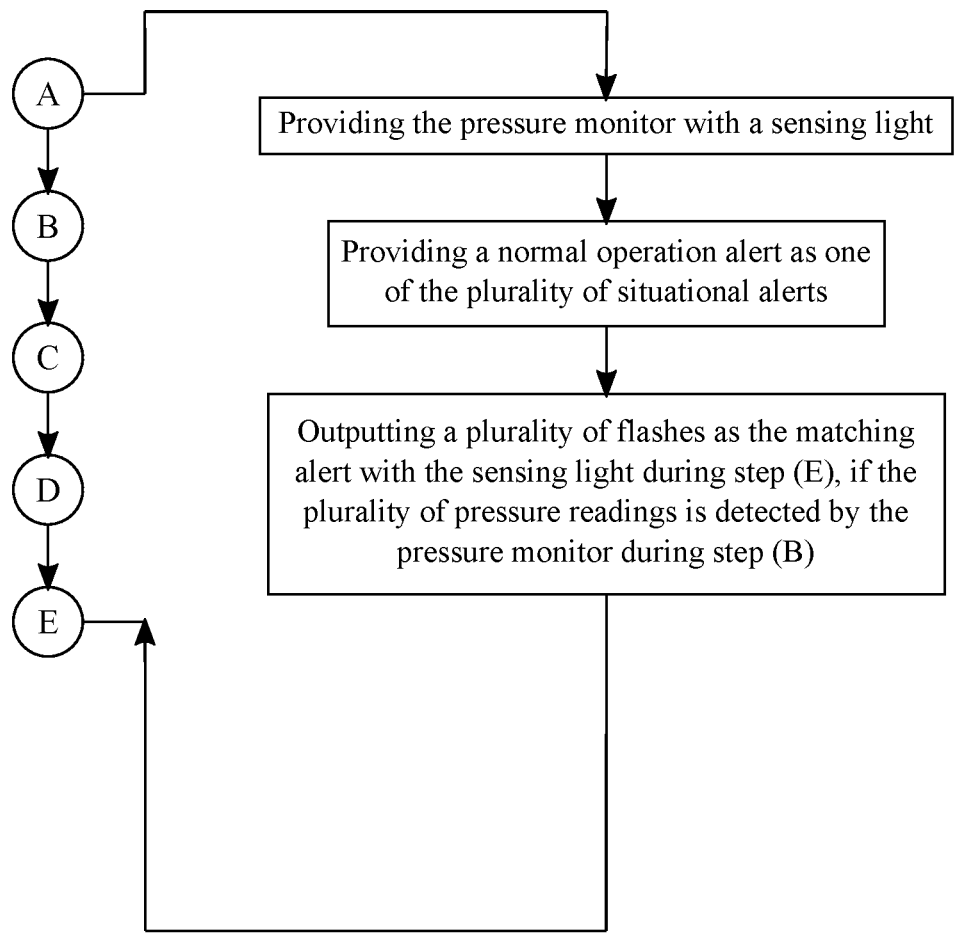
FIG. 10 is a flowchart illustrating the subprocess for outputting a plurality of flashes as the matching alert with a sensing light to indicate a normal operation alert.

The pressure monitor 1 is further provided with a sensing light 7 which visually notifies the user that the pressure monitor 1 itself is properly operating, seen in FIG. 10. A normal operation alert is provided as one of the plurality of situational alerts. The normal operation alert provides confirmation that the pressure monitor 1 is monitoring the duct pressure within a target duct 2. A plurality of flashes is outputted as the matching alert with the sensing light 7 during Step E, if the plurality of pressure readings is detected by the pressure monitor 1 during Step B. The detection of the plurality of pressure readings indicates the normal operation by the pressure monitor 1. The user is therefore aware that the pressure monitor 1 is consistently monitoring the safety of a system.

Figure 11:
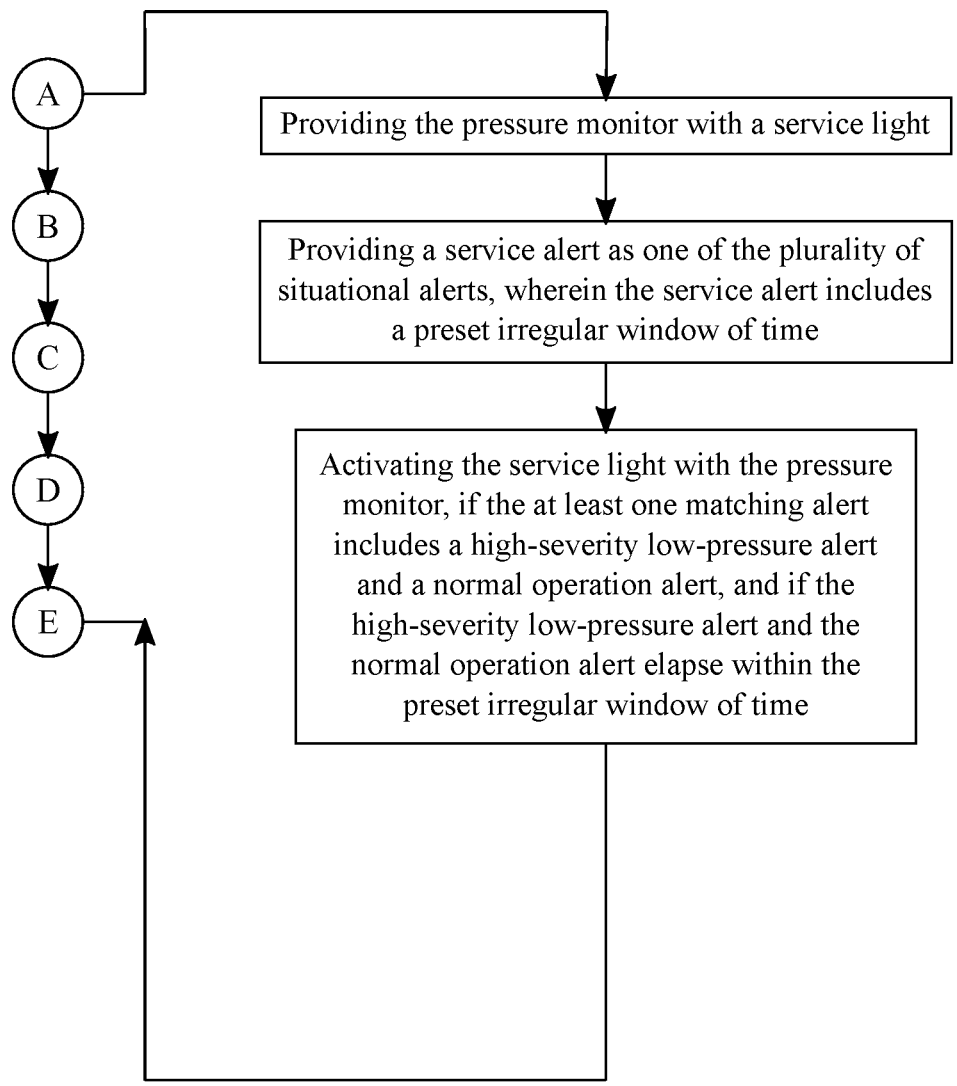
FIG. 11 is a flowchart illustrating the subprocess for activating a service light if a matching alert includes the high-severity low-pressure alert and the normal operation alert.

In the event the corresponding system or the radon mitigation system is experiencing a mechanical issue, the pressure monitor 1 is further provided with a service light 10, seen in FIG. 11. The service light 10 visually notifies the user that the system itself needs servicing. A service alert is provided as one of the plurality of situational alerts, wherein the service alert includes a preset irregular window of time. The irregular window of time corresponds to a fan, more specifically the radon fan, is cycling on and off. The service alert distinguishes between a mechanical issue with the corresponding system and an issue regarding the pressure within a pipe. The mechanical issue may be due to over-temperature protection or a variety of other mechanical issues that need to be addressed by a technician. The service light 10 is activated with the pressure monitor 1, if the at least one matching alert includes a high-severity low-pressure alert and a normal operation alert, and if the high-severity low-pressure alert and the normal operation alert elapse within the preset irregular window of time. The high-severity low-pressure alert and the normal operation alert within the irregular window of time indicates a servicing issue with the system. The user is then visually alerted of a mechanical issue with the system with the service light 10 and audibly alerted with the speaker 8.

Figure 12:
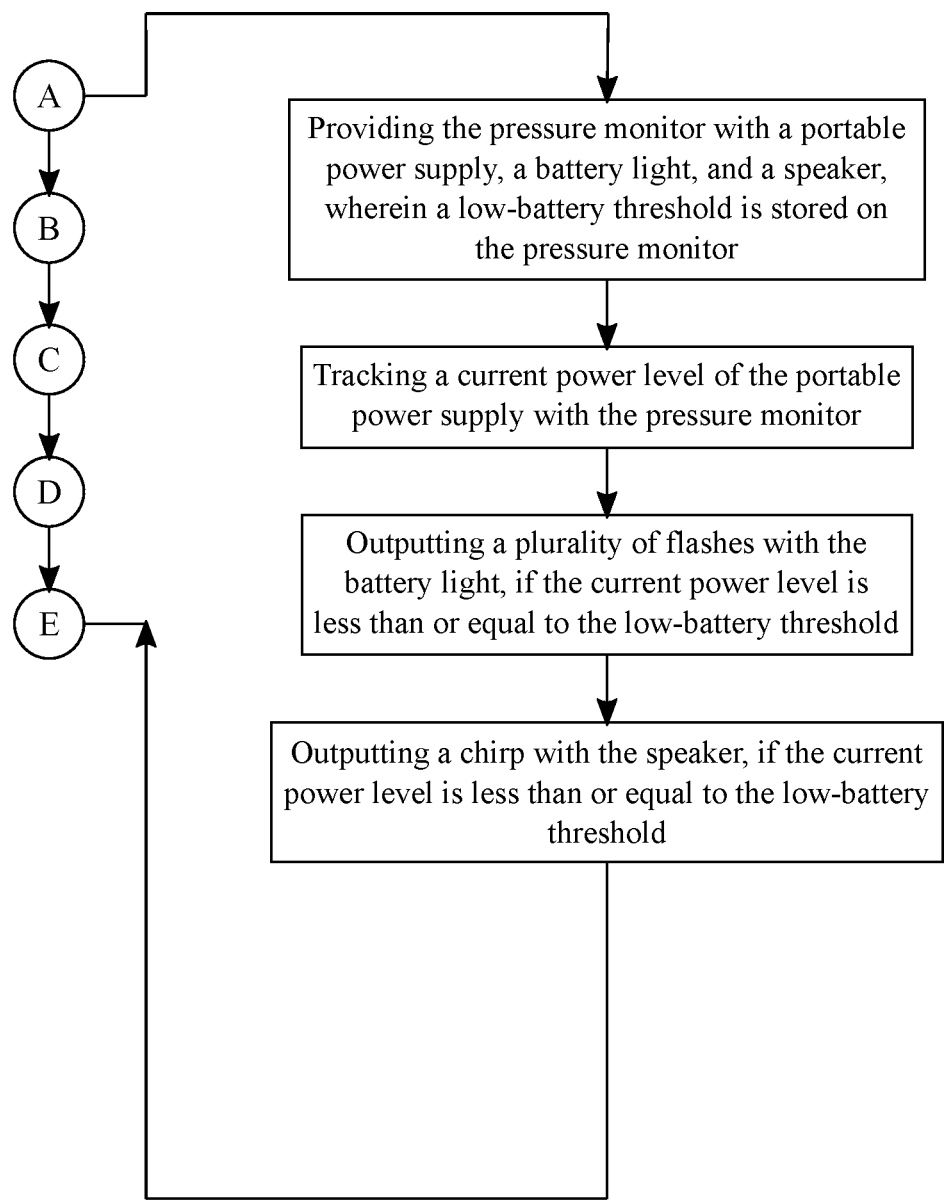
FIG. 12 is a flowchart illustrating the subprocess for outputting a chirp with the speaker to indicate a current power level is less than or equal to a low-battery threshold.

In order to prevent the pressure monitor 1 from completely shutting down completely because the portable power supply 5 has been completely used, the pressure monitor 1 is further provided with a battery alert, seen in FIG. 12. The battery alert notifies the user of a low level of remaining power for the pressure monitor 1. A low-battery threshold is stored on the pressure monitor 1. The low-battery threshold is a minimum amount of power that is necessary to operate the pressure monitor 1. A current power level of the portable power supply 5 is tracked with the pressure monitor 1, in order to monitor the real-time power supply level. A plurality of flashes is outputted with the battery light 9, if the current power level is less than or equal to the low-battery threshold, and a chirp is outputted with the speaker 8, if the current power level is less than or equal to the low-battery threshold. The user is then able to distinguish between alerts and is made aware of the low power supply for the portable power source.

Figure 13:
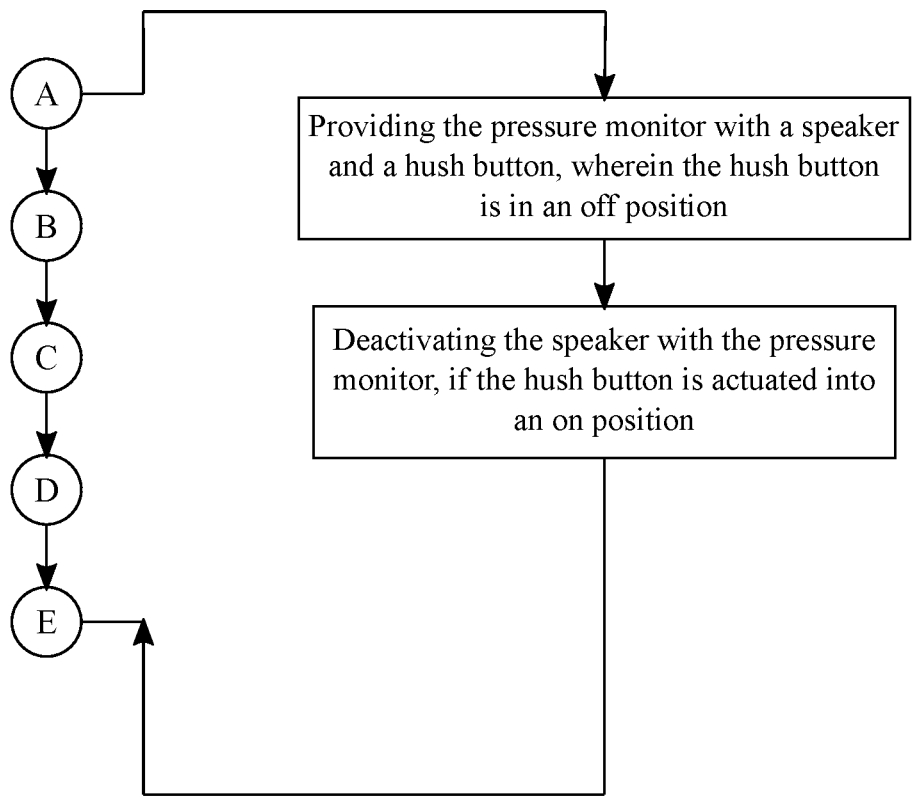
FIG. 13 is a flowchart illustrating the subprocess for deactivating the speaker if a hush button is actuated.

The pressure monitor 1 is further provided with a hush button 11, wherein the hush button 11 is in an off position, seen in FIG. 13. The hush button 11 mutes the speaker 8 of the pressure monitor 1 while either the system is being serviced or the pressure monitor 1 is being serviced. For example, if a pipe or a radon fan is being serviced, the beeping of the pressure monitor 1 is stopped with the hush button 11. The off position enables the speaker 8. The speaker 8 is deactivated with the pressure monitor 1, if the hush button 11 is actuated into an on position so that only the user or a technician may manually mute the pressure monitor 1. The on position temporarily disables the speaker 8.

Figure 14:
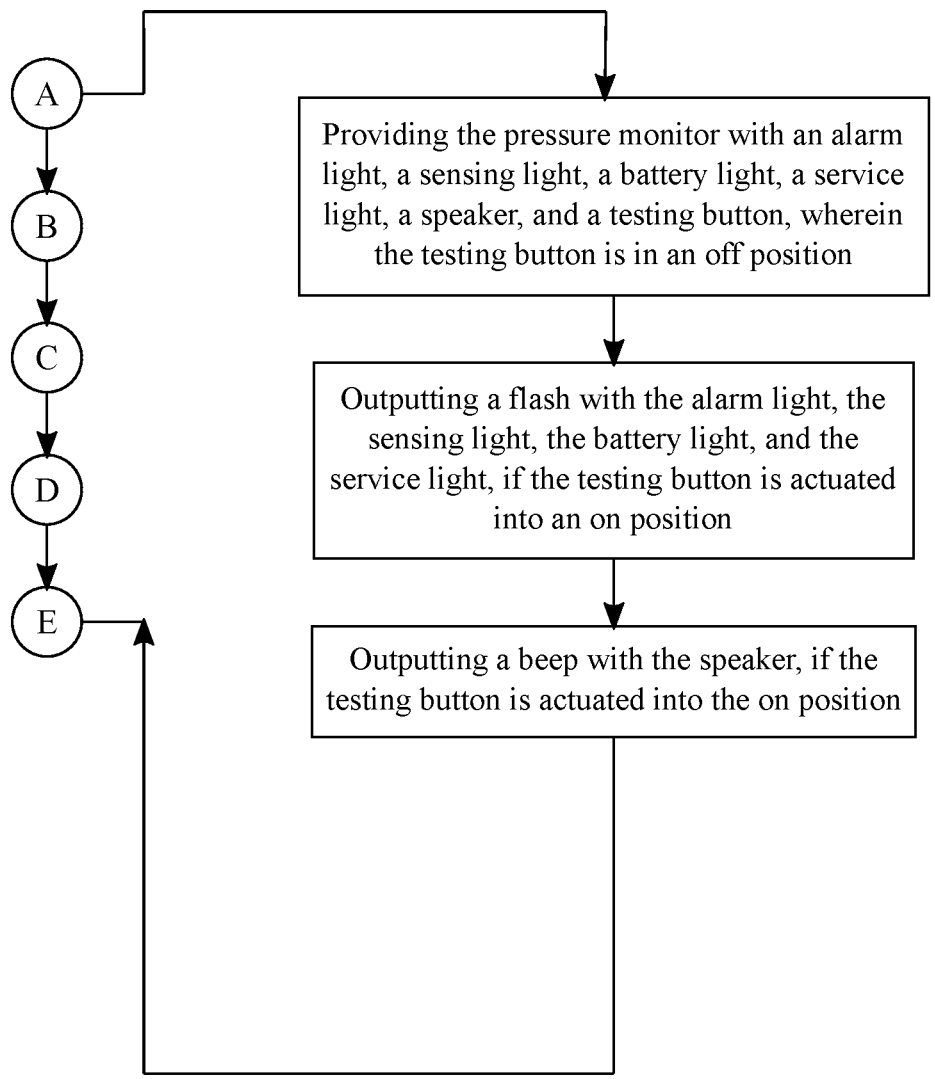
FIG. 14 is a flowchart illustrating the subprocess for outputting both a flash with the alarm light, the sensing light, the battery light, and the service light and a beep with a speaker if a testing button is actuated.

The user or a technician may ensure that the pressure monitor 1 is fully functioning as the pressure monitor 1 further includes a testing button 12, wherein the testing button 12 is in an off position, seen in FIG. 14. The testing button 12 temporarily operates the alarm light 6, the sensing light 7, the battery light 9, and the service light 10, and the off position does not enable the alarm light 6, the sensing light 7, the battery light 9, and the service light 10. A flash is outputted with the alarm light 6, the sensing light 7, the battery light 9, and the service light 10, if the testing button 12 is actuated into an on position, thereby visually notifying the user that each light is fully functioning. Moreover, a beep is outputted with the speaker 8, if the testing button 12 is actuated into the on position, audibly notifying the user that the speaker 8 is fully functioning.

Although the invention has been explained in relation to its preferred embodiment, it is to be understood that many other possible modifications and variations can be made without departing from the spirit and scope of the invention as hereinafter claimed.

What is claimed is:

1. A method of analyzing duct pressure within a pipe, the method comprises the steps of:
(A) providing a pressure monitor and a target duct, wherein the pressure monitor is in fluid communication with the target duct, and wherein the pressure monitor includes a service light, and wherein a plurality of situational alerts is stored on the pressure monitor;
(B) periodically capturing a plurality of pressure readings inside the target duct with the pressure monitor;
(C) timestamping each pressure reading with the pressure monitor;
(D) comparing each pressure reading to each situational alert with the pressure monitor to identify at least one matching alert for at least one specific reading, wherein the matching alert is from the plurality of situational alerts, and wherein the specific reading is from the plurality of pressure readings;
(E) visually and/or audibly outputting the matching alert with the pressure monitor, if the matching alert is identified for the specific reading;
providing a service alert as one of the plurality of situational alerts, wherein the service alert includes a preset irregular window of time; and,
activating the service light with the pressure monitor, if the at least one matching alert includes a high-severity low-pressure alert and a normal operation alert, and if the high-severity low-pressure alert and the normal operation alert elapse within the preset irregular window of time.

2. The method of analyzing duct pressure within a pipe, the method as claimed in claim 1 comprises the steps of:
providing the pressure monitor with at least one piezoresistive pressure sensor; and,
measuring each pressure reading with the piezoresistive pressure sensor during step (B).

3. The method of analyzing duct pressure within a pipe, the method as claimed in claim 2, wherein the target duct is in fluid communication with the piezoresistive pressure sensor through a flexible tubing.

4. The method of analyzing duct pressure within a pipe, the method as claimed in claim 2 comprises the steps of:
providing the pressure monitor with a solenoid valve, wherein the target duct is in fluid communication with the piezoresistive pressure sensor through the solenoid valve; and,
capturing each pressure reading with the pressure monitor during step (B) by opening the solenoid valve.

5. The method of analyzing duct pressure within a pipe, the method as claimed in claim 1 comprises the steps of:
providing the pressure monitor with a portable power supply, wherein a preset low-pressure threshold is stored on the pressure monitor;
capturing an initial pressure reading with the pressure monitor, if an installation of the portable power source is detected by the pressure monitor; and,
calibrating the preset low-pressure threshold in accordance to the initial pressure reading with the pressure monitor.

6. The method of analyzing duct pressure within a pipe, the method as claimed in claim 1 comprises the steps of:
providing the pressure monitor with an alarm light and a speaker;
providing a low-severity low-pressure alert as one of the plurality of situational alerts, wherein the low-severity low-pressure alert includes a preset low-pressure threshold and a preset short window of time; and,
outputting a flash and a beep as the matching alert with the alarm light and the speaker during step (E), if the at least one specific reading elapses as a single pressure reading within the preset short window of time, and if the single pressure reading is less than or equal to the preset low-pressure threshold.

7. The method of analyzing duct pressure within a pipe, the method as claimed in claim 1 comprises the steps of:

providing the pressure monitor with an alarm light;
providing a medium-severity low-pressure alert as one of the plurality of situational alerts, wherein the medium-severity low-pressure alert includes a preset low-pressure threshold and a preset short window of time; and,
outputting a series of flashes as the matching alert with the alarm light during step (E), if the at least one specific reading elapses as multiple pressure readings within the preset short window of time, and if the multiple pressure readings are less than or equal to the preset low-pressure threshold.

8. The method of analyzing duct pressure within a pipe, the method as claimed in claim 1 comprises the steps of:
providing the pressure monitor with an alarm light and a speaker;
providing a high-severity low-pressure alert as one of the plurality of situational alerts, wherein the high-severity low-pressure alert includes a preset low-pressure threshold and a preset long window of time; and,
simultaneously outputting a series of flashes and a series of beeps as the matching alert with the alarm light and the speaker during step (E), if the at least one specific reading elapses as multiple pressure readings within the preset long window of time, and if the multiple pressure readings are less than or equal to the preset low-pressure threshold.

9. The method of analyzing duct pressure within a pipe, the method as claimed in claim 1 comprises the steps of:
providing the pressure monitor with a sensing light;
providing a normal operation alert as one of the plurality of situational alerts; and,
outputting a plurality of flashes as the matching alert with the sensing light during step (E), if the plurality of pressure readings is detected by the pressure monitor during step (B).

10. The method of analyzing duct pressure within a pipe, the method as claimed in claim 1 comprises the steps of:
providing the pressure monitor with a portable power supply, a battery alert, and a speaker, wherein a low-battery threshold is stored on the pressure monitor;
tracking a current power level of the portable power supply with the pressure monitor;
outputting a plurality of flashes with the battery light, if the current power level is less than or equal to the low-battery threshold; and,
outputting a chirp with the speaker, if the current power level is less than or equal to the low-battery threshold.

11. The method of analyzing duct pressure within a pipe, the method as claimed in claim 1 comprises the steps of:
providing the pressure monitor with a speaker and a hush button, wherein the hush button is in an off position; and,
deactivating the speaker with the pressure monitor, if the hush button is actuated into an on position.

12. The method of analyzing duct pressure within a pipe, the method as claimed in claim 1 comprises the steps of:
providing the pressure monitor with an alarm light, a sensing light, a battery light, a service light, a speaker, and a testing button, wherein the testing button is in an off position;
outputting a flash with the alarm light, the sensing light, the battery light, and the service light, if the testing button is actuated into an on position; and,
outputting a beep with the speaker, if the testing button is actuated into the on position.

* * * * *